(12) United States Patent
Kuebel

(10) Patent No.: US 8,024,916 B2
(45) Date of Patent: Sep. 27, 2011

(54) CABLE RUN ELEMENT

(76) Inventor: Johann Kuebel, Kasten (AT)

(*) Notice: Subject to any disclaimer, the term of this patent is extended or adjusted under 35 U.S.C. 154(b) by 238 days.

(21) Appl. No.: 12/433,787

(22) Filed: Apr. 30, 2009

(65) Prior Publication Data
US 2009/0272093 A1 Nov. 5, 2009

(30) Foreign Application Priority Data
May 5, 2008 (AT) .................................. A 717/2008

(51) Int. Cl.
F16G 13/16 (2006.01)

(52) U.S. Cl. ............................. 59/78.1; 248/49; 248/51
(58) Field of Classification Search ............ 59/78, 78.1; 248/49, 51
See application file for complete search history.

(56) References Cited

U.S. PATENT DOCUMENTS

| 3,098,349 A * | 7/1963 | Waninger ........................ 59/78.1 |
| 5,724,803 A * | 3/1998 | Pea .................................. 59/78.1 |
| 6,609,684 B2 * | 8/2003 | Van Scoy et al. ................ 248/49 |
| 6,699,096 B2 * | 3/2004 | Christopherson et al. .... 446/275 |
| 2006/0096772 A1 | 5/2006 | Komiya |

FOREIGN PATENT DOCUMENTS

| EP | 1 851 464 A1 | 11/2007 |
| WO | WO 2006/090059 A1 | 8/2006 |

* cited by examiner

Primary Examiner — David Jones
(74) Attorney, Agent, or Firm — Kilpatrick Townsend & Stockton LLP

(57) ABSTRACT

The invention relates to a cable run element comprising a plurality of links (2) connected in a chain-like manner which are arranged in a starting position, in particular with freely suspended cable run element (1), along a straight line,
wherein all links (2) are pivotable relative to one another with respect to their respectively adjacent links (2) in the same swivel plane (99),
wherein a number of links (2) have two parallel plates (4) extending parallel to the swivel plane (99) of the cable run element (1) and forming a receptacle (46) for a cable to be run between them,
wherein a number of links (2) have guide elements (3) for running a cable in the receptacle (46),
wherein connecting elements (5), which connect the links (2) that are pivotable relative to one another are provided in an end region (43) of the parallel plates (4),
and wherein counterweights (6) are arranged in an end region (44) of the parallel plates (4) opposite the end region (43) on at least two links (2),
so that the center of gravity (9) of the cable run element (1) lies in its starting position and/or in its freely suspended position in the receptacle (46) between the guide elements (3) and the opposite end regions (44).

18 Claims, 6 Drawing Sheets

CABLE RUN ELEMENT

CROSS-REFERENCES TO RELATED APPLICATIONS

This application claims the priority of Austrian Application No. A 717/2008, filed on May 5, 2008, the disclosure of which is incorporated herein by reference.

BACKGROUND OF THE INVENTION

The invention relates to a chain-like cable run element.

Cable run elements of this type are used primarily for laying cables in waste water pipes.

Cables are commonly understood to be flexible objects which have a considerably longitudinal extension, e.g. such as ropes, plastic pipes or the like, with an essentially constant cross section.

There is generally the problem in the prior art that, when laying cables in waste water shafts, the cable and a cable robot must be inserted into the channel through a vertical shaft. Usually, the manhole extends vertically to a sewer pipe that extends essentially horizontally, so that there is an edge when the shaft opens into the channel. There are difficulties when inserting a cable into the channel via the shaft, since the run of the cable in the region of this edge is made more difficult by a great resistance due to friction and deflection and, in such a case, the cable is perhaps damaged.

Some devices for introducing cables are known from the prior art which are screwed together with the shaft and the channel by complicated and error-prone mechanisms. Assembling a device of this type is definitely expensive and, in particular, leads to a great loss of time and requires extensive installation work.

SUMMARY OF THE INVENTION

An object of the present invention is to solve the aforementioned problems and create a cable run element which can be quickly assembled and dismantled and nevertheless still have a high degree of stability and which efficiently avoids entanglements of the cable.

The invention solves the problem with a cable run element having a number of links connected in a chain-like manner which are arranged in a starting position, in particular with a freely suspended cable run element, along a straight line, and which has

- all links that are pivotable relative to one another with respect to their respectively adjacent links in the same swivel plane,
- a number of links, and preferably all links, which have two parallel plates extending parallel to the swivel plane of the cable run element and form a receptacle for a cable to be run between them,
- a number of links, and preferably all links, which have guide elements for running a cable in the receptacle,
- connecting elements, which connect the links so that they are pivotable relative to one another in an end region of the parallel plates, and
- counterweights that are arranged in an end region of the parallel plates opposite the end region on at least two links, so that the center of gravity of the cable run element lies in its starting position, in particular in its freely suspended position, in the receptacle between the guide elements and the opposite end regions.

It is advantageous that the cable run element can be easily aligned in the edge region of the shaft or channel by means of a cable robot and remains in its position without additional outer anchorings. Furthermore, inserting a cable into the cable run element is easily possible without difficulties and the cable cannot escape from the cable run element. Dismantling the cable run element is very easy since loosening a rigid connection between the cable run element and the shaft or channel is no longer required.

In one embodiment of the invention the cable run element is easily mounted and fixed in its operative position. Furthermore, the alignment of the cable run unit is facilitated by means of a remote-controlled robot.

In another especially advantageous embodiment of the invention the cable run elements enable a smooth shifting of the cable relative to the cable run element.

DESCRIPTION OF THE PREFERRED EMBODIMENTS

Figure 1:
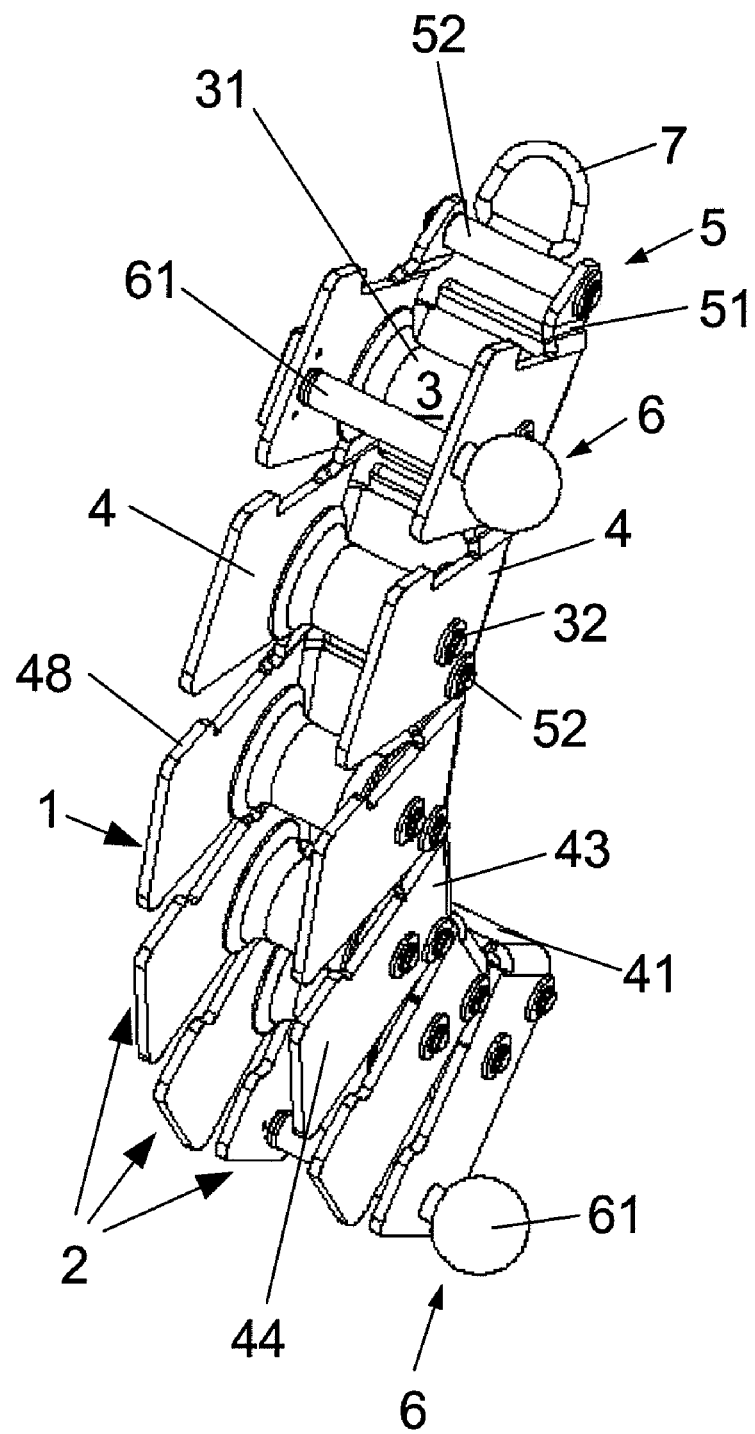
FIG. 1 shows the cable run element in a diagonal view in the tilted state.
Figure 2:
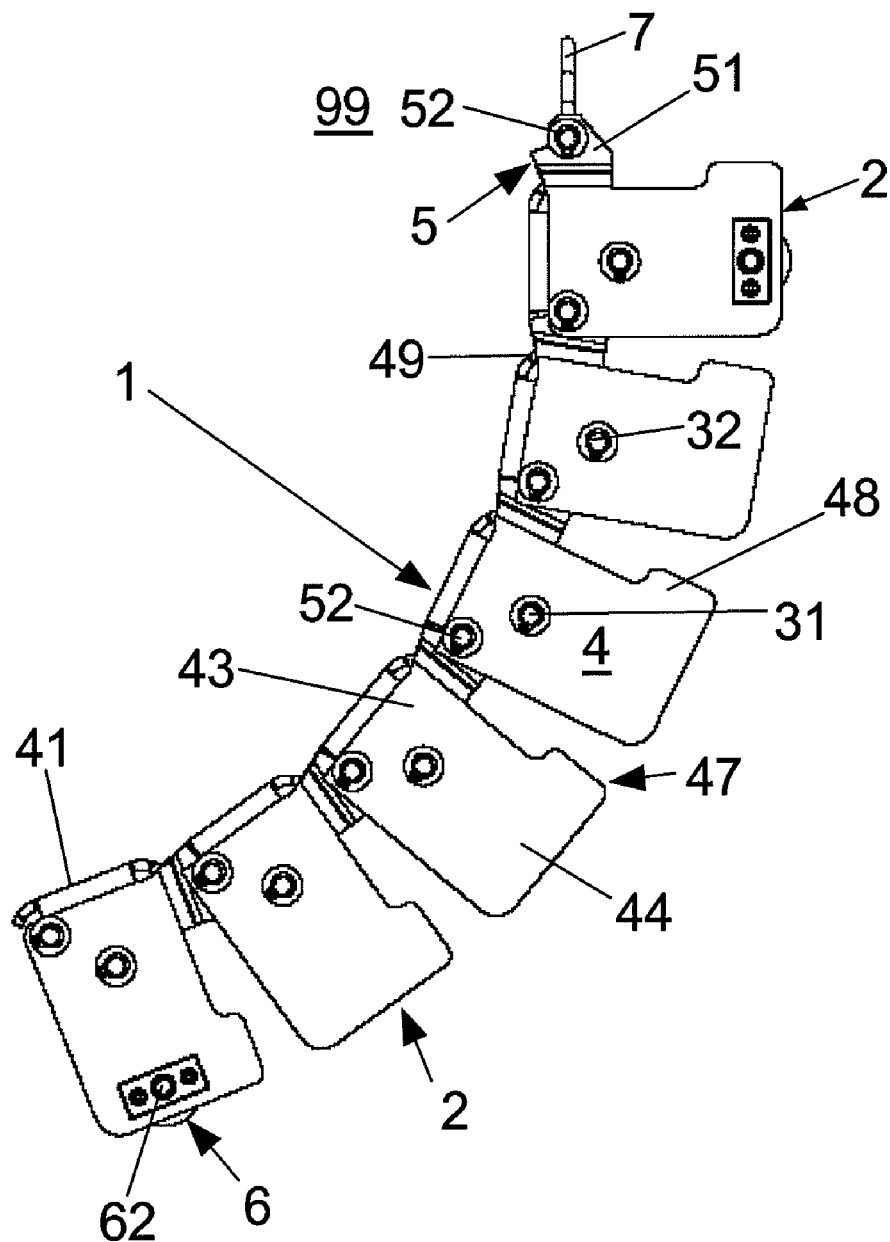
FIG. 2 shows the cable run element in a side view in the tilted state.
Figure 3:
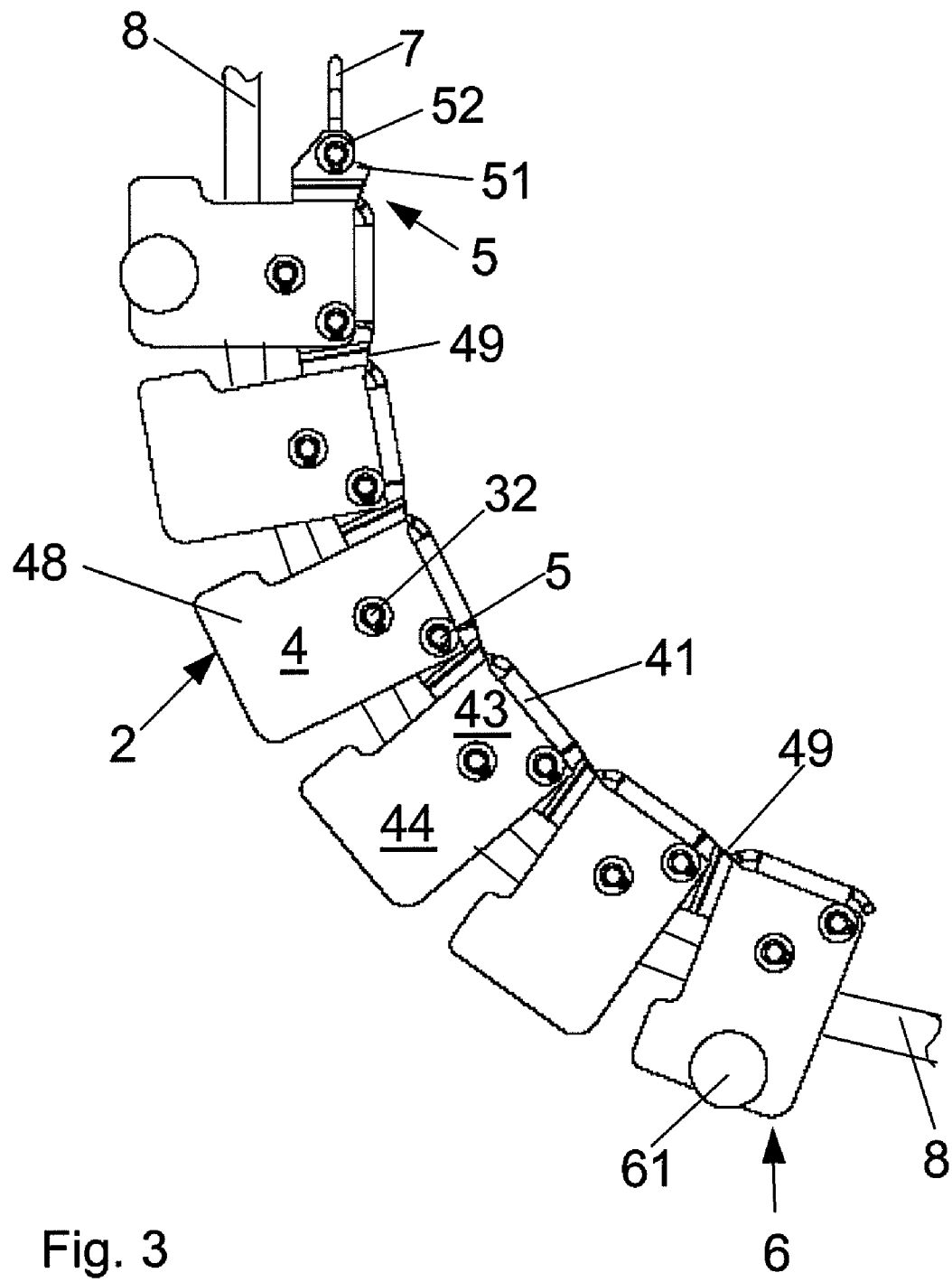
FIG. 3 shows the cable run element in a side view seen from the opposite side.

A chain-like cable run element 1 is shown in FIG. 1. The cable run element 1 comprises a plurality of links 2 which are essentially constructed in the same way. The number of links 2 of a cable run element 1 is, advantageously, between 4 and 10 depending on the desired radius of curvature and angle of buckling. The links 2 of the cable run element 1 are arranged in a row in a chain-like manner, each link 2 having, in particular, molded-on bearing or connecting elements 5 in the form of an offset bearing flange 51, optionally molded on in one piece and pivotally attached to the respective next link 2. The bearing flange 51 is picked up by the respective next link 2, so that the reciprocal pivoting of two adjacent links 2 is possible. This is obtained by providing associated circular recesses both in the offset bearing flange 51 and in the respective subsequent link 2, the recesses being passed through by bearing pins 52.

As can be seen in FIG. 1, all links 2 can be pivoted relative to one another with respect to their respective adjacent or subsequent links 2 in the same swivel plane 99, shown by the drawing plane. Furthermore, each of the links 2 has two parallel plates 4 that extend parallel to the swivel plane 99 of the cable run element 1. In a preferred embodiment, it can be provided that the two parallel plates 4 are formed from a single or the same stamped metal part, whereby the two parallel plates 4 form a U-section with a further plate 41. The height of the links 2 or the length of the parallel plates 4 is between 10 and 20 cm. The further plate 41 is to a large extent rectangular, its length corresponding to the length of a link 2 and the width to the width of the cable run element 1.

Of course, the U-section 47 can also be formed by welding or soldering three separate molded parts together. The links 2 have a longitudinal extension in chain direction of about 5 to 15 cm. The width of the cable run element 1 is dependent on the thickness of the cable 8 to be laid and is in the range of between 5 and 15 cm. The parallel plates 4 are rectangular, the width of the parallel plates corresponding to the length of a link 2 and the length of the parallel plates 4 corresponding to the height of the cable run element 1.

Figure 5:
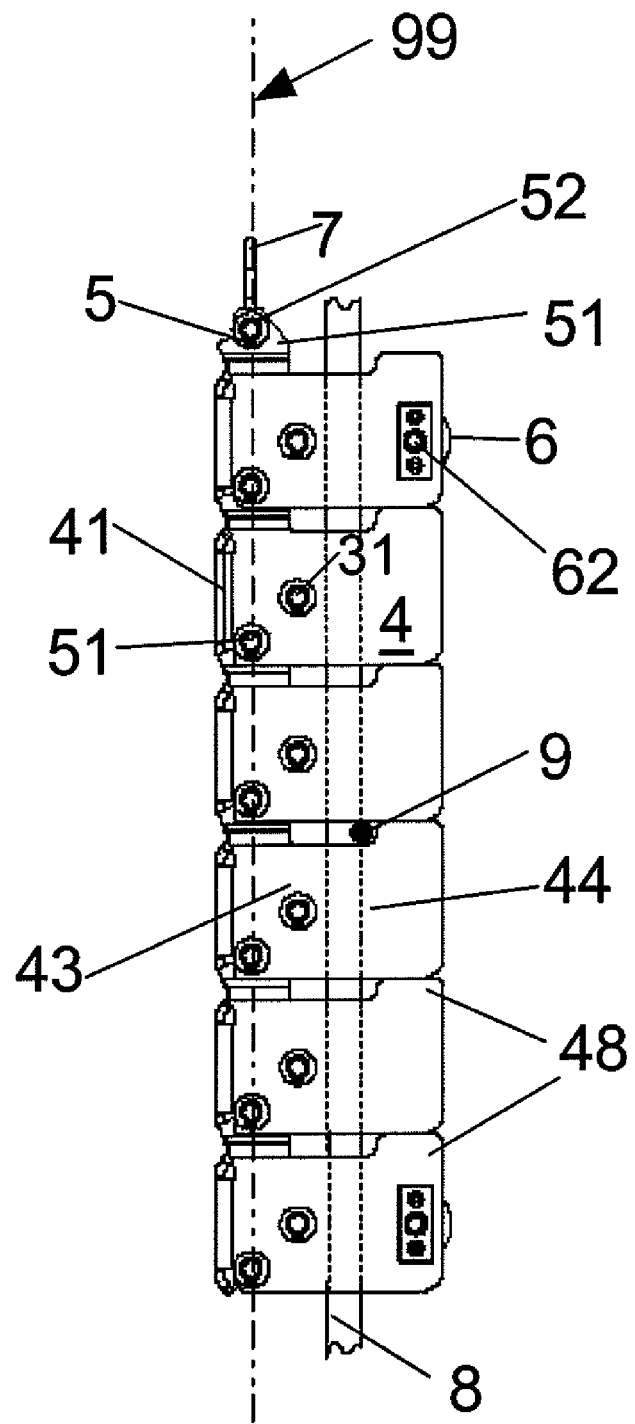
FIG. 5 shows a cable run element in its starting position in a side view.

It can be provided that the parallel plates 4 have a projection 48 in their end region 44 removed from the further plate 41 on at least one of the front ends facing the adjacent links 2. Preferably, the projections 48 project so far in the direction of the closest link 2 that, when the projections 48 adjoin the respective adjacent link 2, all links 2 are aligned so as to extend parallel or along a straight line, as shown in FIG. 5. Projections 48 of this type can be configured to the respective next link 2 or to both adjacent links 2.

In the starting position, the links 2 of the cable run element 1 extend parallel or along a straight line. The starting position is defined in that the links 2 are arranged parallel or along a straight line. An essential advantage of the design of projections 48 of this type is that the swing of the cable run element 1 beyond a preset starting position is prevented by the adjoining projections 48 of the parallel plates 4. The position in which all projections 48 adjoining the respective adjacent links 2 is shown is, in this case, the starting position shown in FIG. 5.

The cable run element 1 has a plurality of guide means or guide elements 3, for example, in the form of guide rollers 31 which are arranged on the individual links 2 of the cable run element 1. These guide rollers 31 are supported on bearing shafts 32 which penetrate the parallel plates 41. These guide rollers 31 are arranged between the parallel plates 4, and the axes or bearing shafts 32 of the guide rollers 31 are normal to the swivel plane 99 of the cable run element 1 or parallel to the swivel axes about which the adjacent links 2 are pivotable.

A special embodiment results when each of the links 2 has a guide roller 31. The guide rollers 31 are pivoted on the links 2. The guide rollers 31 are enlarged in their cross section toward the ends, the outer casing of the guide rollers 31 having, in particular, the shape of a bent curve in the longitudinal section.

In a cable run element 1 according to the invention, it is useful to provide at least so many guide rollers 31 that the cable 8 is only turned around by the guide rollers 31 and does not touch the remaining components of the cable run element 1. As can be seen in FIGS. 1 to 6, the guide rollers 31 are disposed in the vicinity of, but at a distance from, the further plate 41. This distance is in the range of between 1 mm and 2 cm. To ensure an optimum balanced position of the cable run element 1 according to the invention, it is advantageous to provide that the distance of the bearing shafts 32 from the further plate 41 be selected as small as possible. The reciprocally pivotable connecting elements 5, comprising the bearing flange 51 and the pins 52, are situated in the end region 43 of the parallel plates 4 in the vicinity of the further plate 41.

To lower the cable run element 1 into a shaft 91, a retaining element 7, e.g. a hook or an eyelet, can be disposed, in particular, on the free bearing flange 51 of the last link 2. The cable run element 1 can be lowered into the shaft 91 via this retaining element 7 and varied in its position in the shaft 91.

In the end region 44 of the parallel plates 4 opposite the end region 43, weights 6 are arranged on at least two links 2, preferably the first and the last link 2. It is decisive for the functioning of the invention that the center of gravity 9 of the cable run element 1 is in its starting position and/or freely suspended in the region between the bearing axis of the guide roller 31 and the opposite end region 44. The counterweights 6 are thereby in the form of a pin 61. A recess each is provided in the two parallel plates 4 for the pins 61, in particular in the first or last link 2, the counterweights 6 in the form of pins 61 penetrating this recess or passing through them. The central axis of the pin 61 is thereby in the opposite end region 44 of the parallel plates 4, parallel to the bearing shaft 32 of the guide rollers 31 and/or normal to the parallel plates 4.

Figure 4:
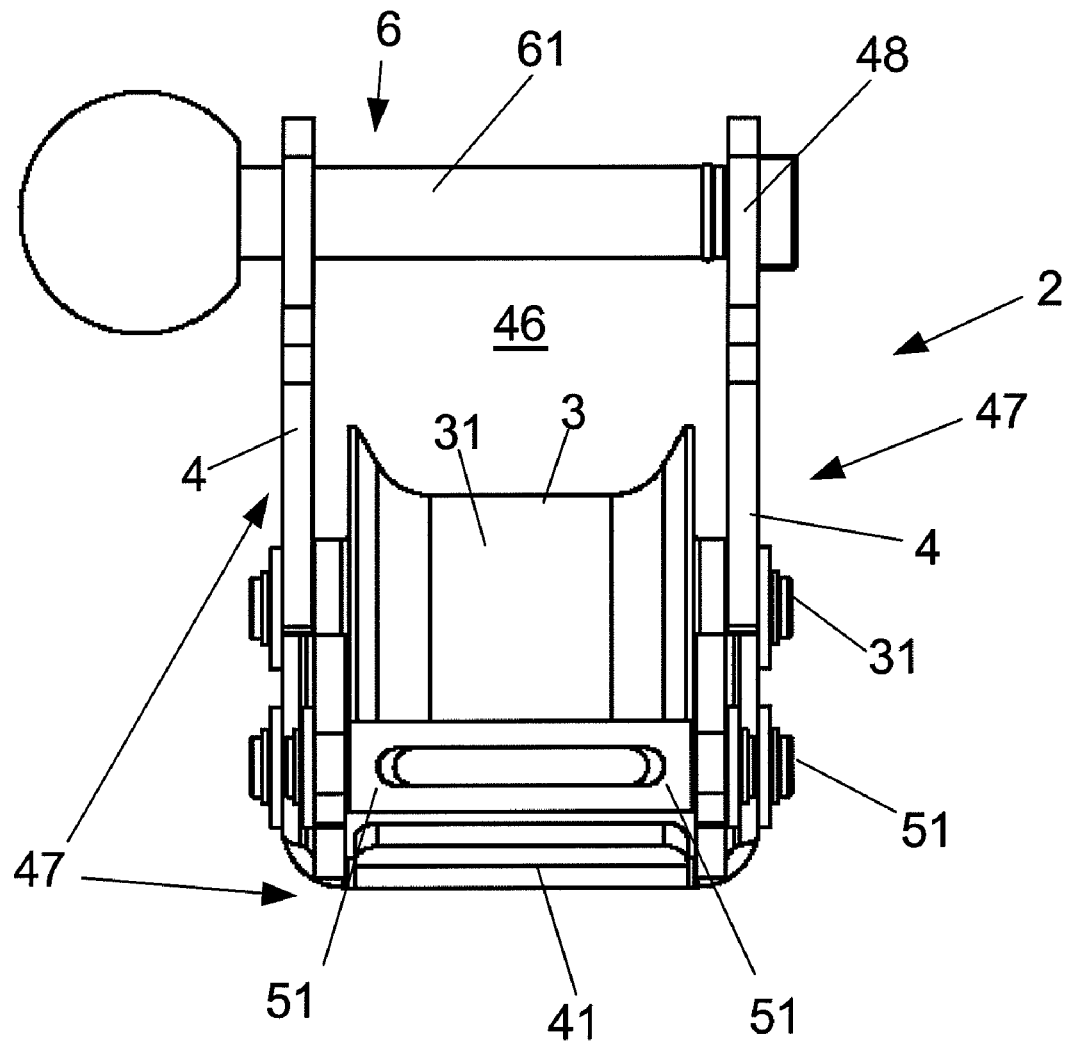
FIG. 4 shows a link of a cable run element in a front view.

As shown in FIG. 4, the area inside the U-section 47 forms a receptacle 46 for the cable 8 to be run which is limited on the sides by the parallel plates 4, by the guide rollers 31 at one end and by the pins 61 on the opposite end.

The ratio of the density of the material of the weights 6 or the pins 61 to the average density of the remaining parts or components of the cable run element 1 is at least 2:1 and is, in particular, in the range of between 4:1 and 6:1.

Advantageously, this relative density can be obtained in that the counterweights 6 or the pins 61 essentially consist of an iron alloy, while the remaining components of the cable run element 1 are formed with plastic or light metal, in particular, aluminum.

To set a maximum curvature or a minimum radius of curvature, a boundary element 49 is formed on the parallel plates 4 or on the further plates 41. This boundary element 49 can be in the form of a stop which prevents a further swing when a preset angle of horizontal swing of, in particular, 5° to 25° is set relative to the starting position. In a preferred embodiment, the boundary element 49 can be securely fastened to the further plate 41 and be directed in the direction of the next link 2 or as an extension of the further plate 41 in the direction of the next link 2. When the next link 2 swings relative to the boundary element 49, the swing path is mechanically limited by the abutment of the boundary element 49 against the plate 41 of the next link 2 and a minimum radius of curvature preset in this way.

Alternatively, this boundary element 49 can also be placed on the bearing flanges 51 and/or on the pins 52, perhaps in the region of the recesses for the pins supporting the bearing flange 51. In this case, both the bearing flange 51 and the recess for the associated pin 52 on its edge have an angle of deflection, in particular directed inward relative to the link 2, as boundary element 49, the two angles of deflection adjoining one another and preventing a further swing of the two links 2 when a maximum preset angle is reached.

Figure 6:
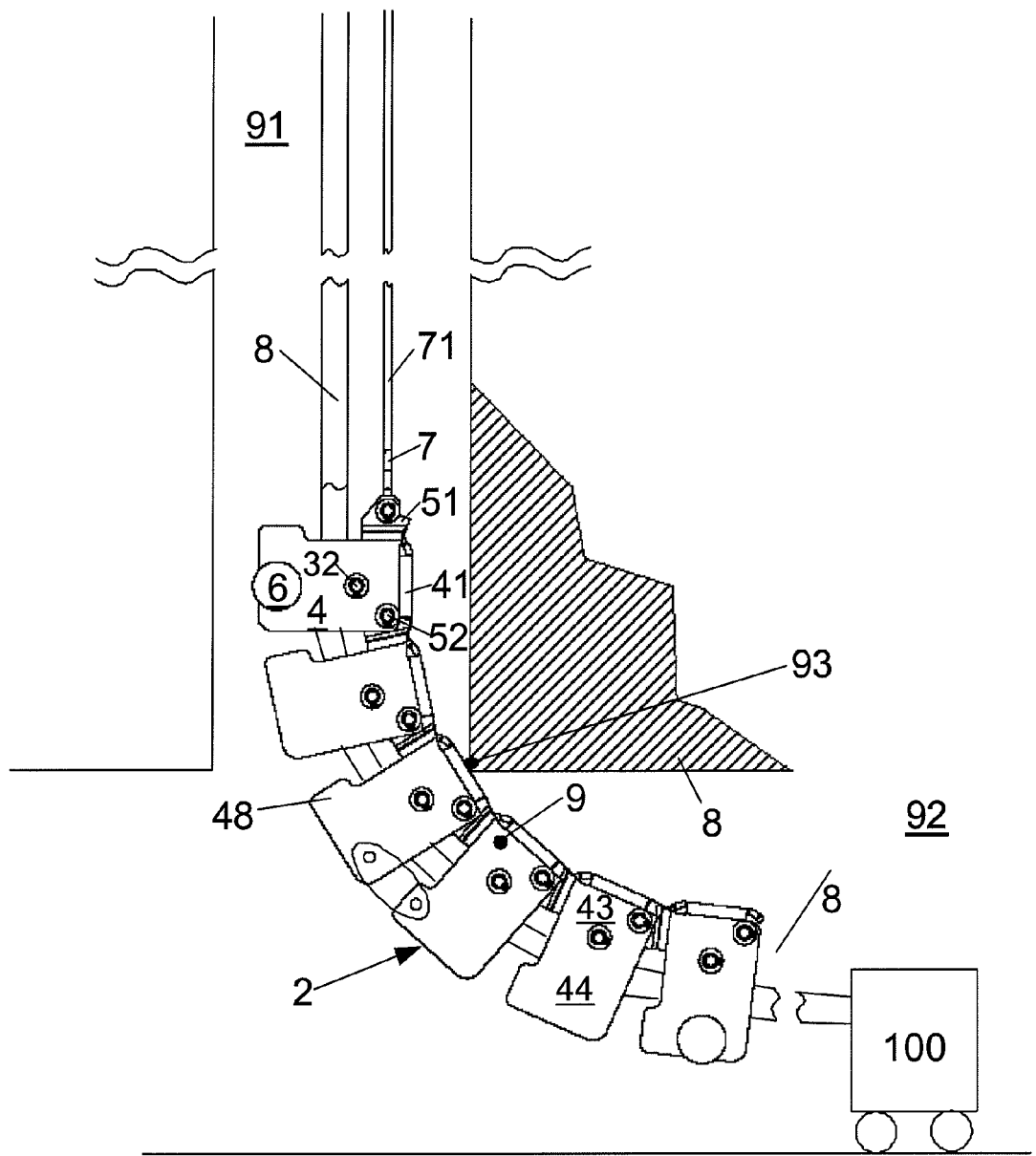
FIG. 6 shows a cable run element in the tilted state or in the operative position in a side view, wherein a cable is mounted in the cable run element and the cable run element adjoins the transitional edge between a shaft and a sewer pipe.

FIG. 6 shows the functioning mode of the cable run element 1 according to the invention. First, the cable run element 1 of the invention is suspended on a retaining element 7, as shown in FIG. 5, at a right angle to the base or lowered into the shaft 91 in this position. In this way, the center of gravity 9 of the cable run element 1 is between the cable 8 and the counterweights 6 or pins 61 or in the vicinity of or in the end region 43 of the plates 4. Advantageously, the cable 8 is inserted into the cable run element 1 in this state and secured by the two pins 61 against a possible slipping out of the cable run element 1. As soon as a cable robot 100, which is connected to the end of the cable 8 on the canal side, moves forward in the direction of the channel 92 away from the shaft 91, the cable run element 1 is deviated or bent from its starting position. By restricting the swing with the boundary elements 49, a swing is only possible in one direction of swing. If the cable robot 100 moves the cable 8 counter to the direction of swing of the cable run element 1, then the latter is in an unstable state due to the location of its center of gravity, so that even the smallest changes lead to a tipping over of the cable run element 1 into a stable position due to the curvature (shown in FIG. 6). Tipping into a position is no longer possible or is also prevented by the abutment against the edge 93.

As a result, the position of the cable run element 1 is easily secured and the position can be further stabilized by tensile stress of a rope 8 attached to the retaining element 7. The cable run element 1 becomes hooked with the edge 93 formed by the opening of the shaft 91 into the channel 92. In addition, slipping off can be prevented by making the side facing the edge 93 of the further plate 41 of the cable run element 1 with elastic material.

As long as the cable robot 100 is in the shaft 91, the position of the cable run element 1 is fixed, whereby the cable 8 can be slid over the guide rollers 31 and inserted into the channel 92. When this process is finished, the tensile stress of the rope 71 which carries the cable run element 1 can be locked and the cable robot 100, which is now no longer connected with the cable, can be driven back out of the channel 92. At the same time, the cable 8 is also loosened and the cable run element 1 on the retaining element 7 with the rope 71 is removed from the shaft 91.

Alternatively, it can be provided that the two parallel plates 4 are connected with a web connecting the opposite end regions 44 of a link 2. The location of the center of gravity is improved by this, however, inserting the rope 8 into the cable run element 1, especially with a large number of links 2, is more difficult to carry out.

In the suspended state of the cable run element 1, the lowermost link 2 hangs, swung about a specific angle due to its dead weight.

Webs of this type prevent the cable 8 from coming out of the receptacle 46.

The invention claimed is:

1. A cable run element comprising a number of links connected in a chain-like manner which are arranged in a starting position with a freely suspended cable run element along a straight line,
all links being pivotable relative to one another with respect to their adjacent links in a common swivel plane,
a number of links having two parallel plates extending parallel to the swivel plane of the cable run element and forming a receptacle for a cable to be run between them,
a number of links having guide elements for running a cable in the receptacle,
connecting elements, which connect the links that are pivotable relative to one another, being provided in an end region of the parallel plates,
and counterweights being arranged in an end region of the parallel plates opposite the end region on at least two links,
so that a center of gravity of the cable run element lies in its starting position in the receptacle between the guide elements and the opposite end region.

2. The cable run element according to claim 1, wherein the counterweights are in the form of pins or webs which are arranged in the opposite end region of the parallel plates or which connect said end regions.

3. The cable run element according to claim 1, wherein the counterweights are arranged at least on the first and last link.

4. The cable run element according to claim 1, wherein a recess is provided in the two parallel plates through which the counterweights are run in the form of a pin, and
wherein a central axis of the pin extends at a right angle to the swivel plane and/or is normal to the parallel plates.

5. The cable run element according to claim 1, wherein the ratio of the density of the material of the counterweights or the pins to the average density of the material of the remaining parts of the cable run element is at least 2:1 and/or the counterweights consist essentially of an iron alloy, whereas remaining components of the cable run element are made of plastic and/or light metals.

6. The cable run element of claim 5 wherein the average density of the material is in the range between 4:1 to 6:1.

7. The cable run element according to claim 1, wherein the plates are connected on each of their end regions with a further plate, and wherein the parallel plates and the further plate of a link each are formed in one piece as a U-section in the form of a stamped metal part.

8. The cable run element according to claim 7, wherein the connecting elements of the reciprocally swivable links are arranged in the end region of the parallel plates in the close vicinity of the further plate.

9. The cable run element according to claim 1, wherein the links are adapted to swing in one preset direction of swing from their starting position or a freely suspended position, while a swing in an opposite direction is suppressed or prevented.

10. The cable run element according to claim 1, wherein adjacent links on the further plate and/or on the parallel plates have boundary elements that prevent a further swing with respect to the starting position when a swivel position is attained or at a preset angle of swing.

11. The cable run element according to claim 1, wherein the connecting elements are shaped in the form of bearing flanges which are rigidly connected with the links and the bearing flange is swivel-mounted via bearing pins or rivets with a flange or a plate of an adjacent link.

12. The cable run element according to claim 1, wherein the guide elements include the axes of the guide rollers forming the guide elements which are normal to the swivel plane of the cable run element.

13. The cable run element according to claim 12, wherein, in the two parallel plates of the respective link, recesses are provided into which the bearing axles are inserted for the guide rollers which are pivotally mounted opposite the links or plates.

14. The cable run element according to claim 12, wherein the guide rollers have an enlarged cross section toward their ends, and wherein an outer casing of the guide rollers has the shape of a concavely bent curve in longitudinal section.

15. The cable run element according to claim 1, wherein the parallel plates of the individual links in the starting position or freely suspended position of the cable run element adjoin one another with their lateral ends and prevent the links from swinging against the direction of swing.

16. The cable run element of claim 15 including projections which project in the direction of an adjacent link in the opposite end region of the plates on at least one lateral end.

17. The cable run element of claim 1 wherein all links have guide elements for running the cable in the receptacle.

18. The cable run element of claim 1 wherein the center of gravity of the cable run element lies in its freely suspended position.

* * * * *